United States Patent [19]

Kopetzky

[11] Patent Number: 5,409,176
[45] Date of Patent: Apr. 25, 1995

[54] RETRACTOR DEVICE FOR A SEAT BELT

[75] Inventor: Robert Kopetzky, Mutlangen, Germany

[73] Assignee: Takata Corporation, Tokyo, Japan

[21] Appl. No.: 103,248

[22] Filed: Aug. 9, 1993

[51] Int. Cl.$^6$ .................... B65H 75/48; B60R 22/44
[52] U.S. Cl. ................................................. 242/375.3
[58] Field of Search ......... 242/107, 107.4 R, 107.4 A, 242/107.4 B, 375.3

[56] References Cited

U.S. PATENT DOCUMENTS

| 4,084,765 | 4/1978 | Bonnaud | 242/107.4 B |
| 4,290,564 | 9/1981 | Karlsson | 242/107 |
| 5,074,483 | 12/1991 | Wang | 242/107 |

FOREIGN PATENT DOCUMENTS

| 2547586 | 3/1977 | Germany | 242/107 |
| 2824595 | 12/1978 | Germany | 242/107 |

Primary Examiner—John M. Jillions
Attorney, Agent, or Firm—Kanesaka & Takeuchi

[57] ABSTRACT

A retractor for a safety belt 17 in power vehicles includes a belt reel 11, which is secured in fixed rotating fashion to a first cable reel 12 with a spiral groove 15. Wound in the groove 15 is a flexible tension element 13, which extends to a second cable reel 14 with a spiral groove 18. The two cable reels 12, 14 taper axially in opposite directions. The cable reel 14 is subjected to the action of a spiral spring 16 in direction of rotation such that the safety belt 17 is wound onto the belt reel 11. The spiral spring 16 is housed in a cavity 21 in the second cable reel 14.

6 Claims, 8 Drawing Sheets

RETRACTOR DEVICE FOR A SEAT BELT

The present invention is to create a spring-driven roller for safety belts in power vehicles, in which the spring unit is housed in such a way that no additional special requirements arise for the spring unit.

According to the invention, a second cable reel has a partly hollow design and is used at the same time for housing the spring unit, particularly the coil spring. Any additional housing space for the spring unit is thereby avoided; in addition, the partially hollow design of the second cable reel provides savings in weight. Also created is the optimal transmission of force from the coil spring to the second cable reel, without the need for special force transmission means.

Particularly when the diameter of the second cable reel is greater than the diameter of the first cable reel, more space is created for housing the spring unit. This design has a further advantage in that the tractive force exerted by the spring unit is reduced down for the safety belt and consequently less rotation of the second cable reel is needed for a takeup path of the safety belt. This provides the safety belt with a greater winding length. It is also possible to provide a reel translation ratio of 1:1 when the safety belt is first drawn out, which then decreases when the safety belt is further drawn out.

Creation of a larger housing space for the spring unit is thus associated with the advantage of a greater safety belt takeup length. In terms of space, the larger mean diameter of the second cable reel is compensated for at least in part by a correspondingly smaller mean diameter of the first cable reel.

DETAILED DESCRIPTION OF PREFERRED EMBODIMENTS

Figure 1:
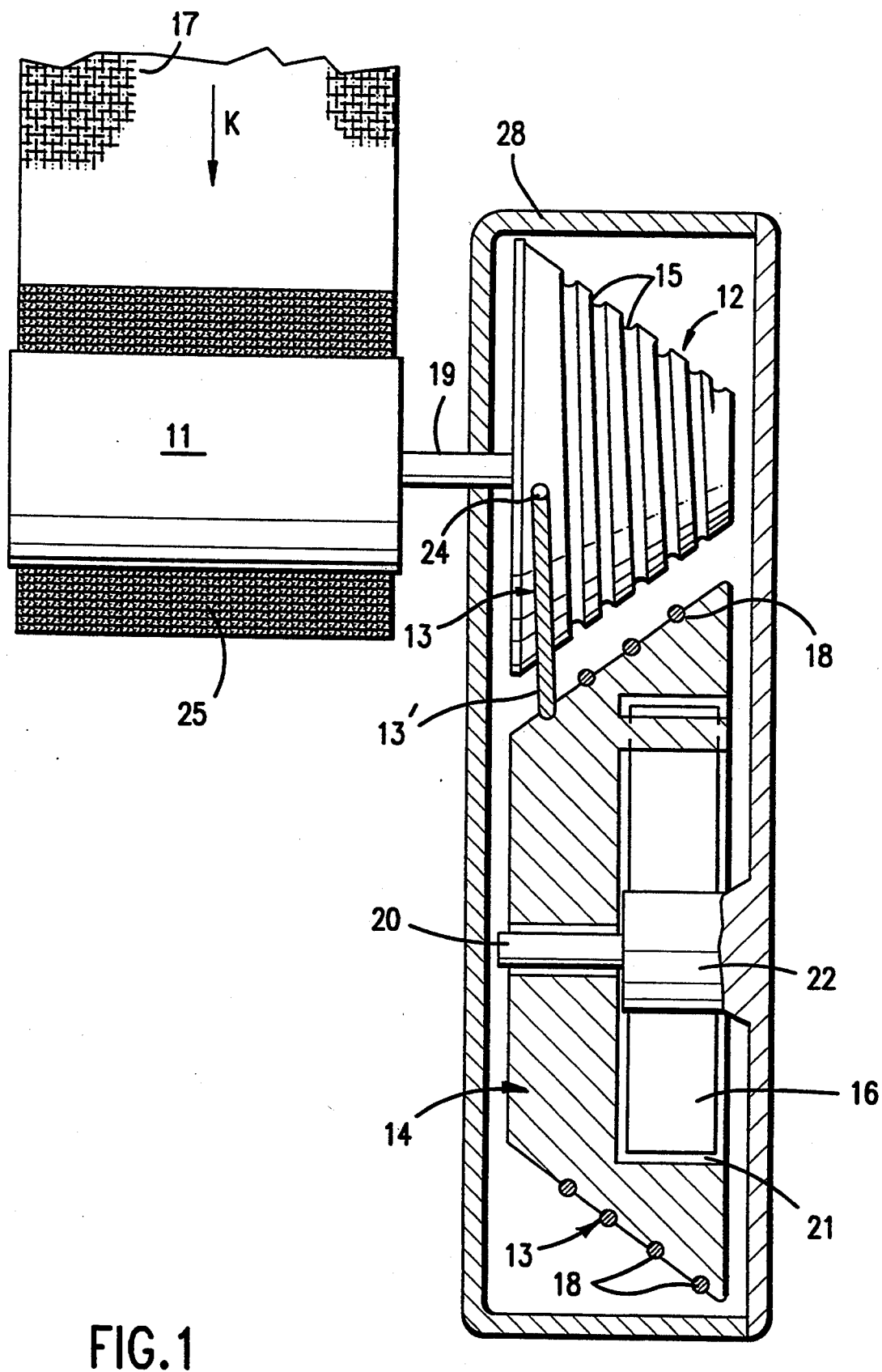
FIG. 1 is a partial section of a spring-driven roller for a safety belt.

In FIG. 1 a belt roller according to the invention exhibits a belt reel 11, onto which a safety belt 17 indicated only by a short segment can be wound. The belt reel 11 is positioned outside a housing 28 and can be turned by means of a shaft 19. Positioned at the end of the shaft 19 facing away from the safety belt and within the housing 28 is a conically shaped cable reel 12, which is provided with a spiral groove 15; the course of this groove 15 is indicated schematically in FIG. 4.

Figure 4:
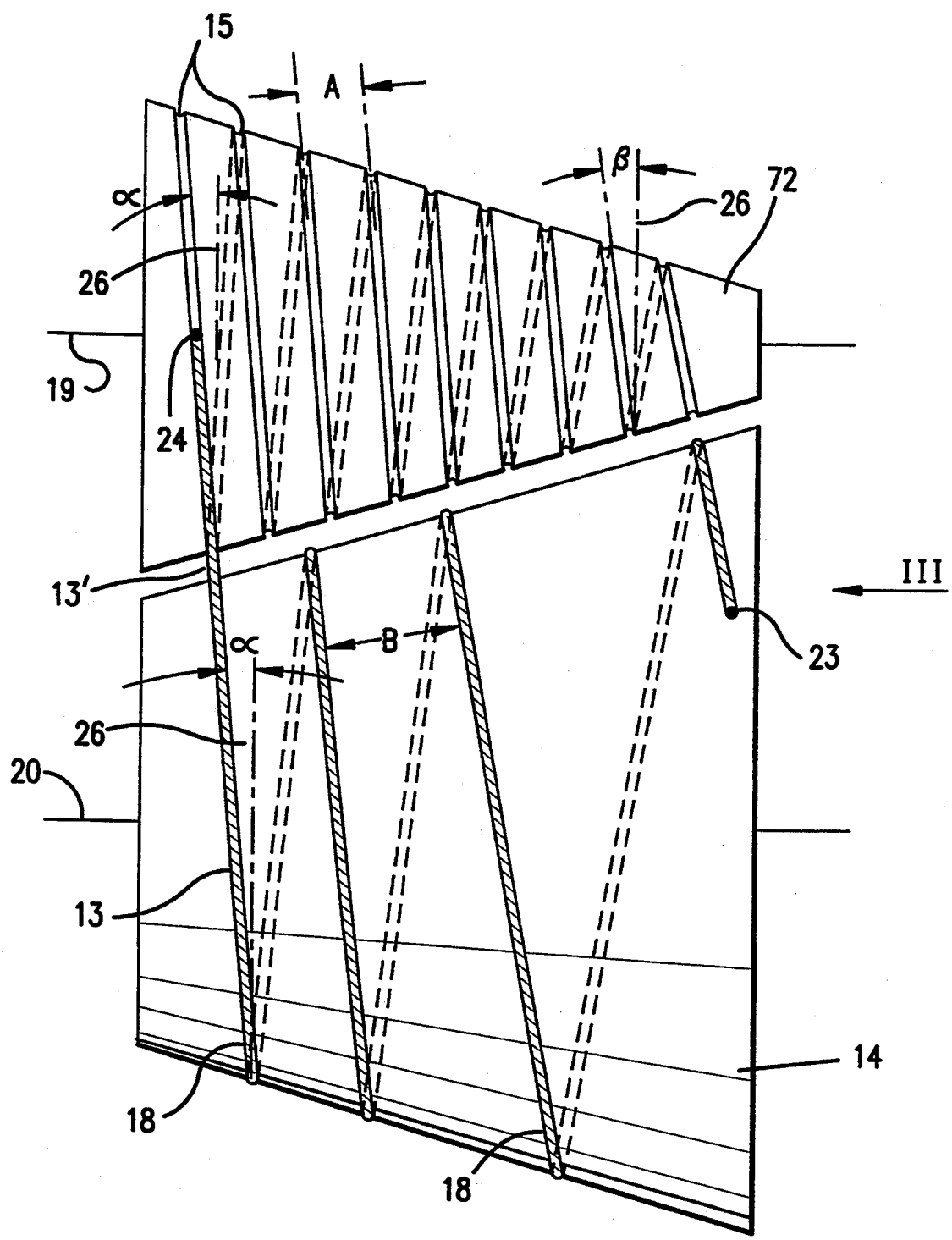
FIG. 4 is a view analogous to FIG. 1 of only the cable reel with wound up cable, schematically depicting the differing axial separating distances of the grooves on the cable reels.

FIGS. 1 and 4 show another cable reel 14 with a parallel axle 20 and is positioned laterally. The second cable reel 14 tapers conically in a direction opposite to that of the first cable reel 12, and its smaller diameter is equal to the larger diameter of the first cable reel 12. The second cable reel 14 also exhibits a spiral groove over its circumference, whose precise geometrical course is shown in FIG. 4.

The second cable reel 14 is mounted in rotating fashion on a shaft 20 and is secured to the housing parallel to and at a lateral distance from the shaft 19.

In FIG. 1 the second cable reel 14 exhibits a coaxial cavity 21 in which a spiral spring unit 16 is provided; this spiral spring unit 16 is secured one side to a pin 22 fixed to the housing and supporting the shaft 20 and on the other side to the inner circumference of the cable reel 14. The spiral spring transmits torque to the cable reel 14 and this torque tends to wind a cable 13 which runs in the groove 18 and which, in FIG. 4, is secured to point 23. In FIGS. 1 and 4 the cable 13 runs from the smallest part of the cable reel 14 to an aligned part of the groove 15 of cable reel 12, where the cable 13 is secured to the surface of cable reel 12 at point 24.

In the coiling position shown in FIGS. 1 and 4 the cable 13 is almost completely wound onto cable reel 14 and almost completely unwound from the first cable reel 12. In this position the belt winding 25 on the belt reel 11 is thickest, i.e., a maximum belt length has been wound onto the belt reel 11 and the belt 17 is at its minimum length.

If the belt 17 is now pulled out against the retracting force K in FIG. 1, the first cable reel 12 rotates in a direction such that the cable 13 is successively wound onto the first cable reel 12 and increasingly runs within the groove 15. At the same time, the cable 13 is unwound from the second cable reel 14.

According to the invention the gradient angle $\alpha$—i.e., the angle between the straight extension of the grooves 15, 18 at the openings for the straight cable segment 13' and the plane 26, running vertical to the rotating axles 19, 20,—of the two grooves 15, 18 at the openings is identical, and furthermore the attachment of the cable ends at 23, 24 assures that the cable segment 13' running freely in a straight line between the cable reels 12, 14 opens into both grooves 15, 18 without impediment. The uniform axial separating distance A for the groove 15 is formed on the first cable reel 12, and the axial separating distance B between the windings of groove 18 on the cable reel 14 continually increases as the diameter increases in the manner evident in FIG. 4.

Since the windings of the spiral groove 15 on the first cable reel 12 are separated by the same axial amount A, the gradient angle increases from $\alpha$ to $\beta$ as the diameter changes from large to small.

It is also conceivable to have the groove 15 run along the circumference of the cable reel 12 in such a way that the gradient $\alpha$ is constant; however, this means that the axial distance A between adjacent windings of the groove 15 would decrease with the decreasing diameter. Correspondingly, the axial distance B of adjacent windings of the groove 18 on cable reel 14 would have to be reduced and the gradient angle there be left constant.

Figure 2:
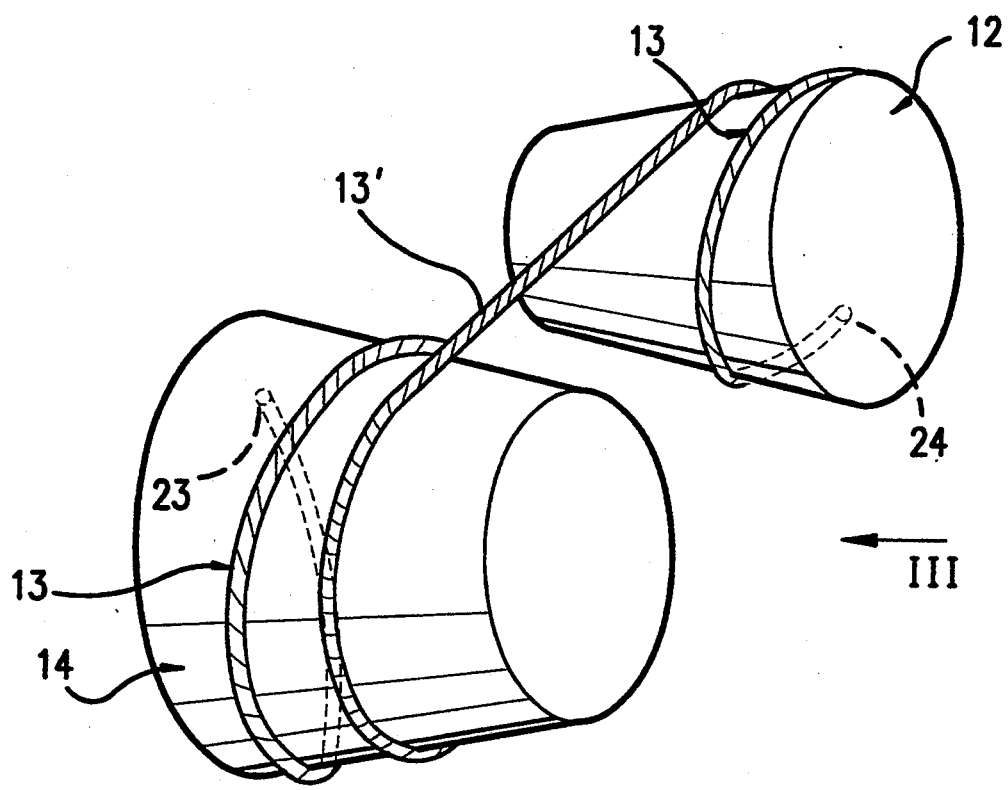
FIG. 2 is a schematic perspective view of the two cable reels, connected by a cable, of the embodiment shown in FIG. 1.

In FIG. 2 the arrangement of the two conical cable reels 12, 14 is schematically shown in a perspective view, without the grooves 15, 18.

Figure 3:
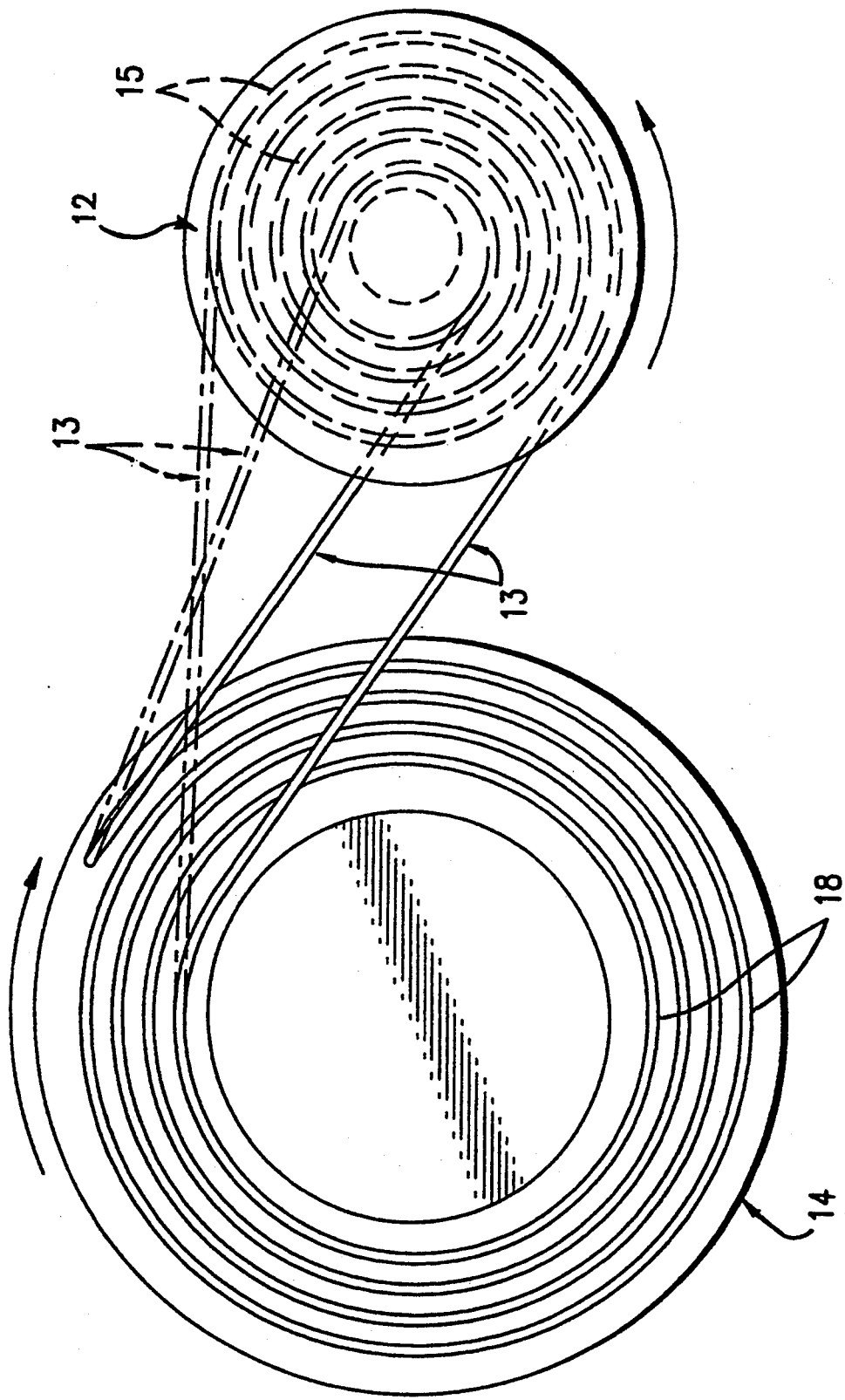
FIG. 3 is a front view of the two cable reels in the direction of arrow III shown in FIGS. 2 and 4 depicting the two terminal stages of cable reel rotation shown by the solid and dashed lines.

FIG. 3 shows the two terminal positions of the cable 13 for two embodiments, in the fully wound and fully unwound positions of the two cable reels 12 and 14.

In FIG. 3 the solid lines show cable 13 tangentially guided cross-wise to the adjacent cable reels 12, 14. The dashed line shows the fully wound and fully unwound positions of cable running in uncrossed parallel fashion from a cable reel 12 to the adjacent cable reel 13. Both cable arrangements (crossed or parallel) are possible according to the invention.

The small diameter portion of the cable reel 12 may be, e.g., 15 mm or somewhat larger, while the large diameter portion of the smaller cable reel 12 should be 30 to 35 mm.

The small diameter portion of the cable reel 14 consequently is 30 to 35 mm and the large diameter portion of the cable reel 14 is 100 to 120 mm.

In the following figures identical reference number indicate the same components as in the embodiments described above.

Figure 5:
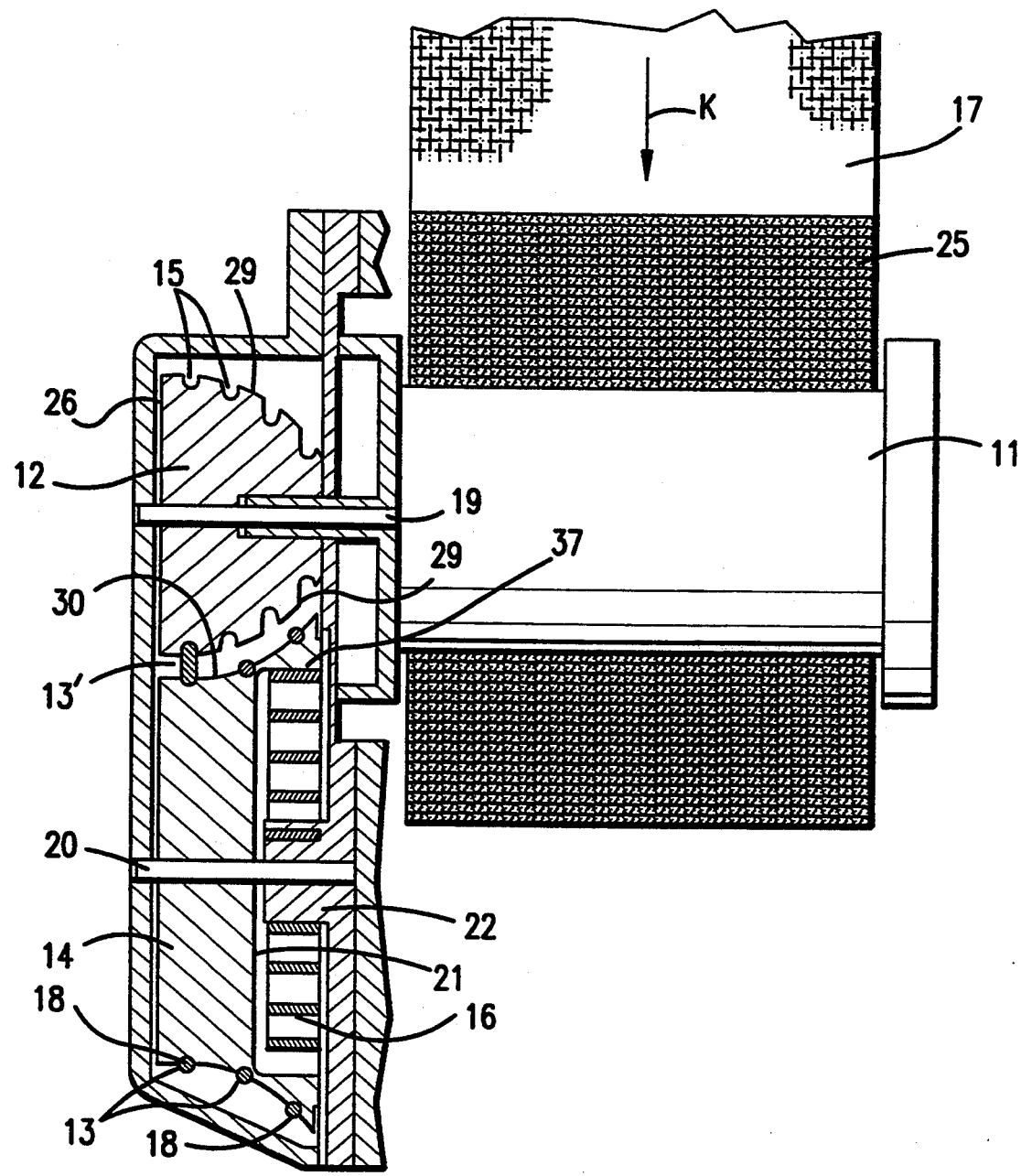
FIG. 5 is a schematic section of another embodiment of a spring-driven roller for safety belts in power vehicles according to the invention.

As shown in FIG. 5, a cable reel 12 provided with a convex generator 29 is positioned within the housing 26, and is disposed at the end of shaft 19 facing away from the belt reel 11; the cable reel 12 is again provided with the spiral groove 15 over its circumference. At a portion where the cable reel 12 has its greatest diameter the tangent to the generator 29 runs somewhat horizontally and the curvature changes gradually toward the axis (shaft 19) in the direction of the smaller diameter. The preferred form of the generator is basically semi-circular.

In addition to cable reel 12, a second cable reel 14 with the larger mean diameter is provided, again with a parallel axis 20 and a concave curvature; the second cable reel 14 exhibits a generator 30, curved in concave fashion, which is complementary to the generator 29. The small diameter portion of the cable reel 14 corresponds approximately to the large diameter portion of the cable reel 12. Again provided on the circumference of the second cable reel 14 is the spiral groove 18.

In the winding position shown in FIG. 5 the cable 13 is almost completely wound onto the cable reel 14 and almost completely unwound from the first cable reel 12. In this position the safety belt 17 is retracted to the greatest extent, i.e., it is in its resting position, and the belt winding 25 on the belt reel 11 has reached its greatest diameter.

If the belt 17 is drawn out against the retractive force K of FIG. 5, the first cable reel 12 turns in a direction such that the cable 13 is successively wound onto the first cable reel 12, while increasingly running within the groove 15. At the same time, the cable 13 is unwound from the second cable reel 14.

According to the invention the gradient angle between the straight extension of the grooves 15, 18 at the openings for the straight cable segment 13' and the plane running vertical to the rotating axles 19, 20 is identical for both grooves 15, 18 at the openings, and furthermore the attachment of the cable ends at 23, 24 assures that the cable segment 13' running freely in a straight line between the cable reels 12, 14 opens into both grooves 15, 18 without impediment. Thus, the uniform axial separating distance for the groove 15 is formed on the first cable reel 12, and the axial separating distance between the windings of groove 18 increase on the cable reel 14 as the large diameter continually increases.

Figure 7:
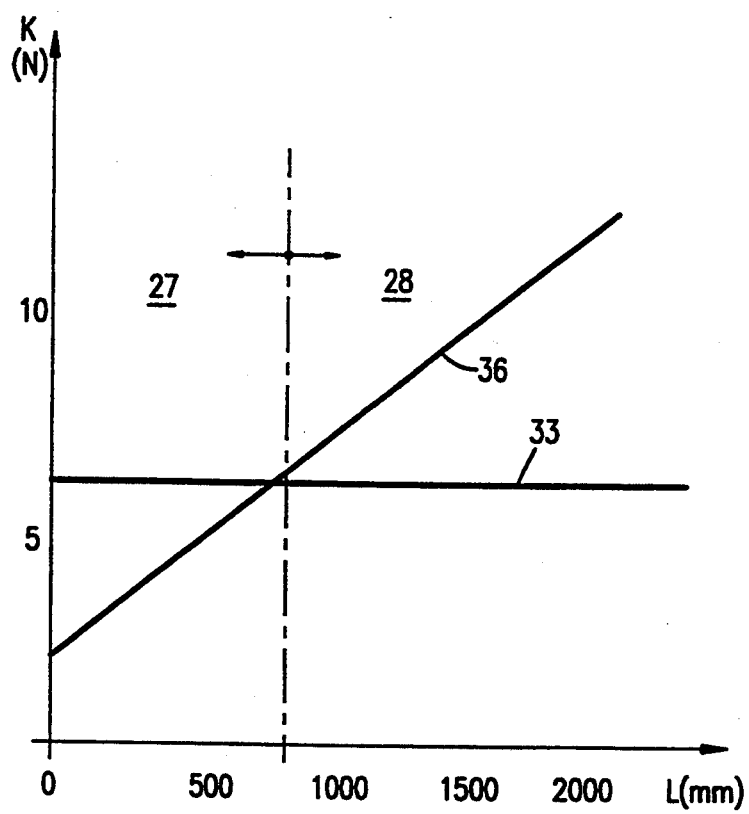
FIG. 7 is a graph showing takeup force (K) and takeup length (L) for a conventional belt roller and one according to FIGS. 1 to 4.

FIG. 7 shows that, because of the continually increasing spring action, the takeup force K as a function of the takeup length increases in very marked linear fashion (line 36) in the case of a conventional belt roller without the cable reels 12, 14 according to invention; the takeup force is smallest in the detachment area 27 and largest in the attachment area 28.

The counter-directional conical design of the cable reels 12, 14 according to FIGS. 1 to 4 assures the constant takeup force (indicated in Newton) shown by the straight curve 33, independent of the takeup length, which is indicated in millimeters.

Figure 8:
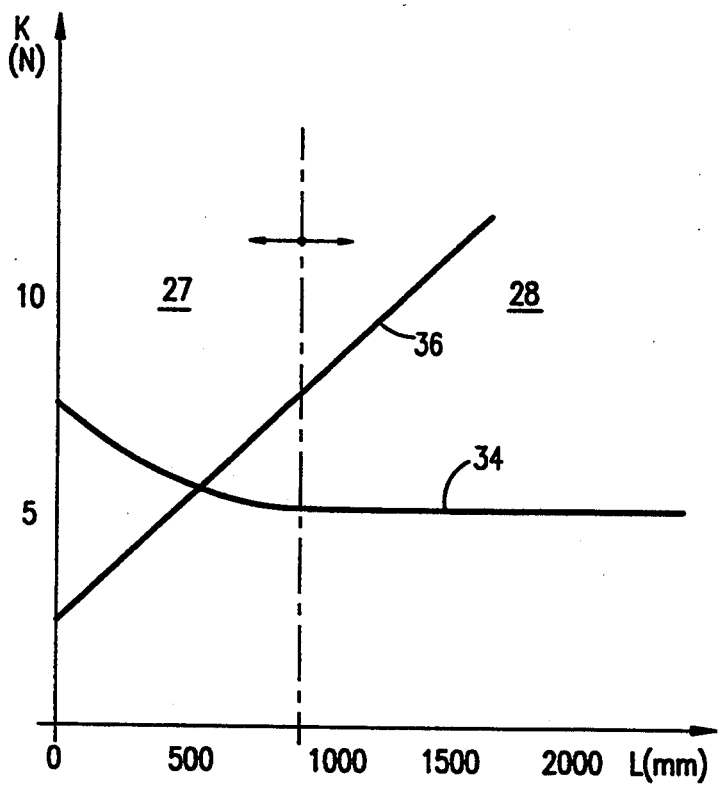
FIG. 8 is a comparable graph for the embodiment according to FIG. 5.

In addition to the force-distance curve 36 for the conventional belt roller, FIG. 8 shows function 34, according to which the belt roller of FIG. 5 operates. Since in the retracted state in which the safety belt 17 is most frequently positioned, shown in FIG. 5, the cable 13 is positioned at the maximum diameter of cable reel 12 and the smallest diameter of cable reel 14, the belt takeup force K is largest in this state.

As the safety belt 17 is withdrawn the straight segment 13' runs excessively proportion to the small diameter portion of the cable reel 17 and to the large diameter portion of the cable reel 14. Thus, the belt takeup force decreases continually within the detachment area and then assumes a basically constant value in the attachment area.

Figure 6:
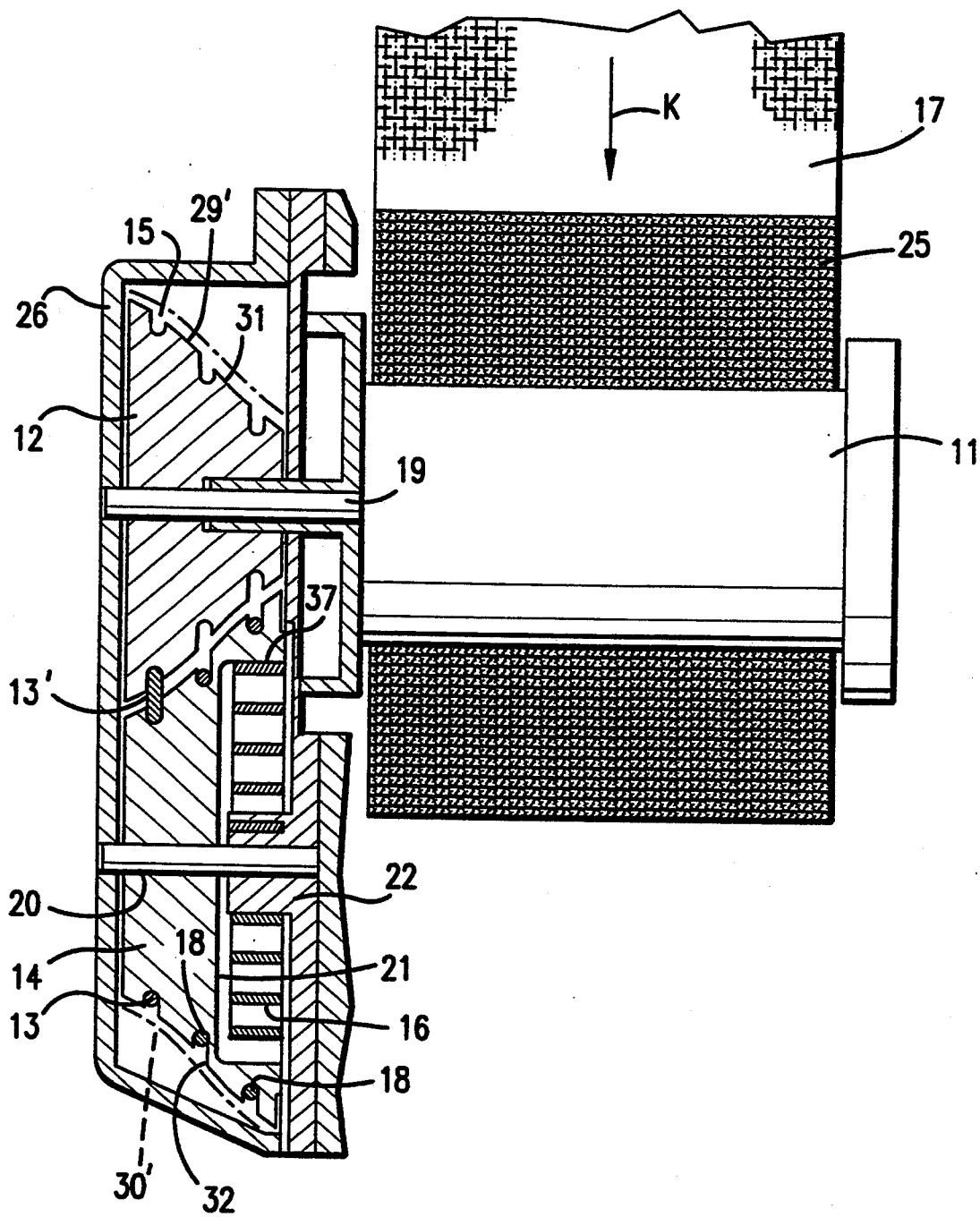
FIG. 6 is a comparable section view of another advantageous embodiment.
Figure 9:
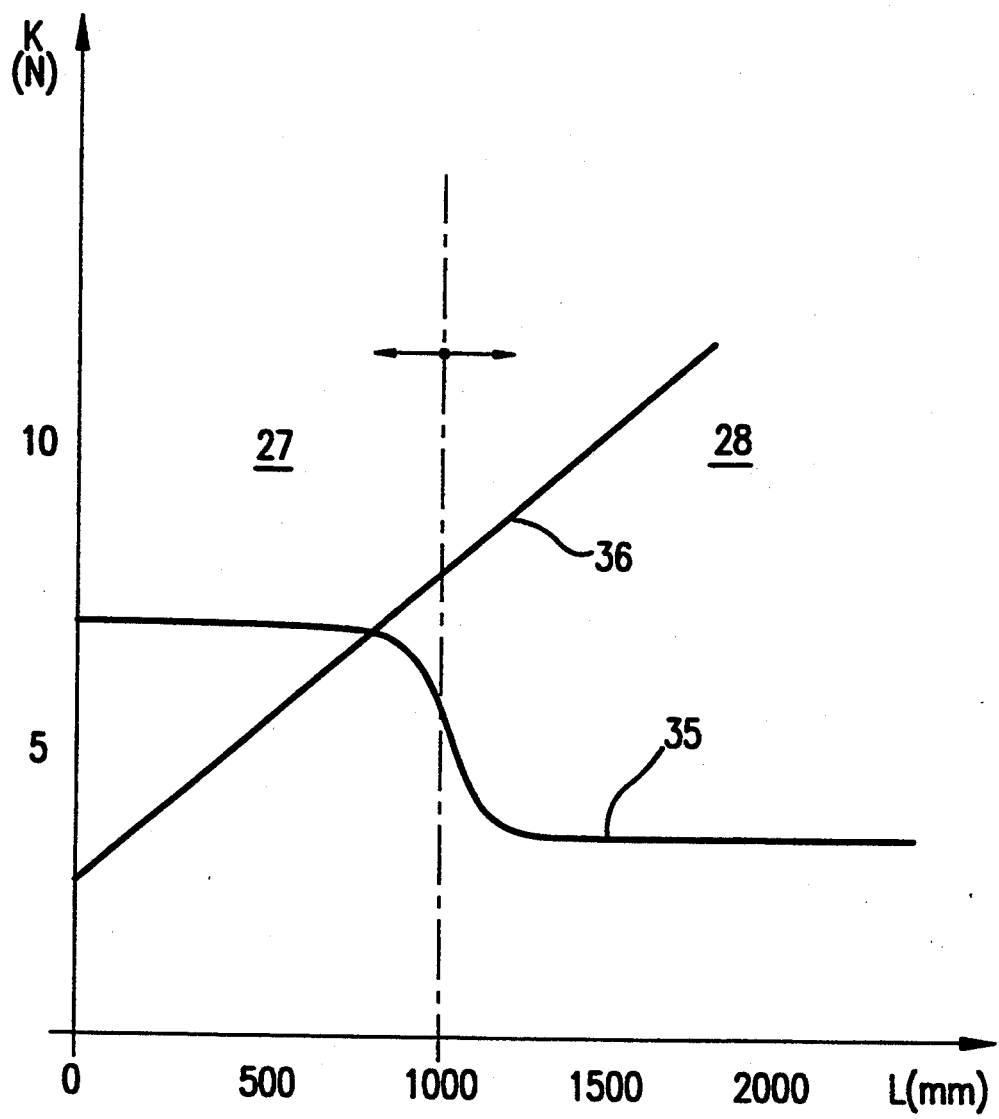
FIG. 9 is a comparable graph for the embodiment according to FIG. 6.

In the embodiment shown in FIG. 6, the generators 29', 30', indicated separately by dot-dashed lines, belonging to the cable reels 12, 14 are curves with complementary shapes, each with a turning point 31 or 31. This results in the takeup force—takeup length function 35 shown in FIG. 9. In the detachment area 27 the takeup force K has a relatively large value of, e.g., 7 N that is almost constant; it then drops to a lower value of, e.g., 4 N in the transition area from detachment area 27 to attachment area 28, to become relatively constant in the attachment area 28.

The essential effect of the embodiments of FIGS. 5 and 6 thus rests in the fact that when the safety belt is retracted into its resting position and after a retraction path (of, e.g., several cm) still in the attachment area 28 passes, a considerably larger retraction force than in the attachment area, where the safety belt rests against the body of the user and must not exert an excessive force, operates from the beginning of the detachment area.

What is claimed is:

1. A retractor for a seat belt mounted on a belt reel, comprising,
   a first reel connected to the belt reel, said first reel having a first tapered surface portion formed at one side thereof and a first spiral groove formed on the first tapered surface portion,
   a second reel arranged parallel to the first reel, said second reel having a second tapered surface portion formed at one side thereof to face the first tapered surface portion, a second spiral groove formed on the second tapered surface portion, and a cavity in a center thereof, said second reel having a mean diameter greater than that of the first reel to reduce rotating force applied to the second reel,
   a flexible tension element connected at one end to the first reel to be wound in the first spiral groove when the seat belt on the belt reel is withdrawn and at the other end to the second reel, said flexible tension element being disposed in the second spiral groove and being withdrawn from the second spiral groove when the seat belt on the belt reel is withdrawn, and a spring situated in the cavity of the second reel and connected to the second reel so that the second reel winds the flexible tension element thereon to thereby wind the seat belt on the belt reel.

2. A retractor for a seat belt according to claim 1, wherein one of said first and second tapered surfaces projects to have a convex surface, and the other of said first and second tapered surfaces is concaved, said convex and concave tapered surfaces closely facing to each other to regulate forces applied to the seat belt through the spring.

3. A retractor for a seat belt according to claim 1, wherein said first reel has a large diameter portion, and the second reel has a small diameter portion, said large diameter portion of the first reel being substantially the same as the small diameter portion of the second reel.

4. A retractor for a seat belt according to claim 1, wherein distances between portions of the first spiral groove on the first tapered surface in an axial direction of the first reel are constant, and distances between portions of the second spiral groove on the second tapered surface in an axial direction of the second reel increase as a diameter of the second reel increases.

5. A retractor for a seat belt according to claim 1, wherein said first tapered surface projects, and the second tapered surface is concaved.

6. A retractor for a seat belt according to claim 1, wherein said first and second tapered surfaces have complementary curves having turning points.

* * * * *